Feb. 6, 1962 R. M. GRAY 3,019,925
BLOCK HANDLING APPARATUS
Filed April 24, 1958 8 Sheets-Sheet 1

INVENTOR.
Robert M. Gray
BY
Jennings, Carter & Thompson
Attorneys

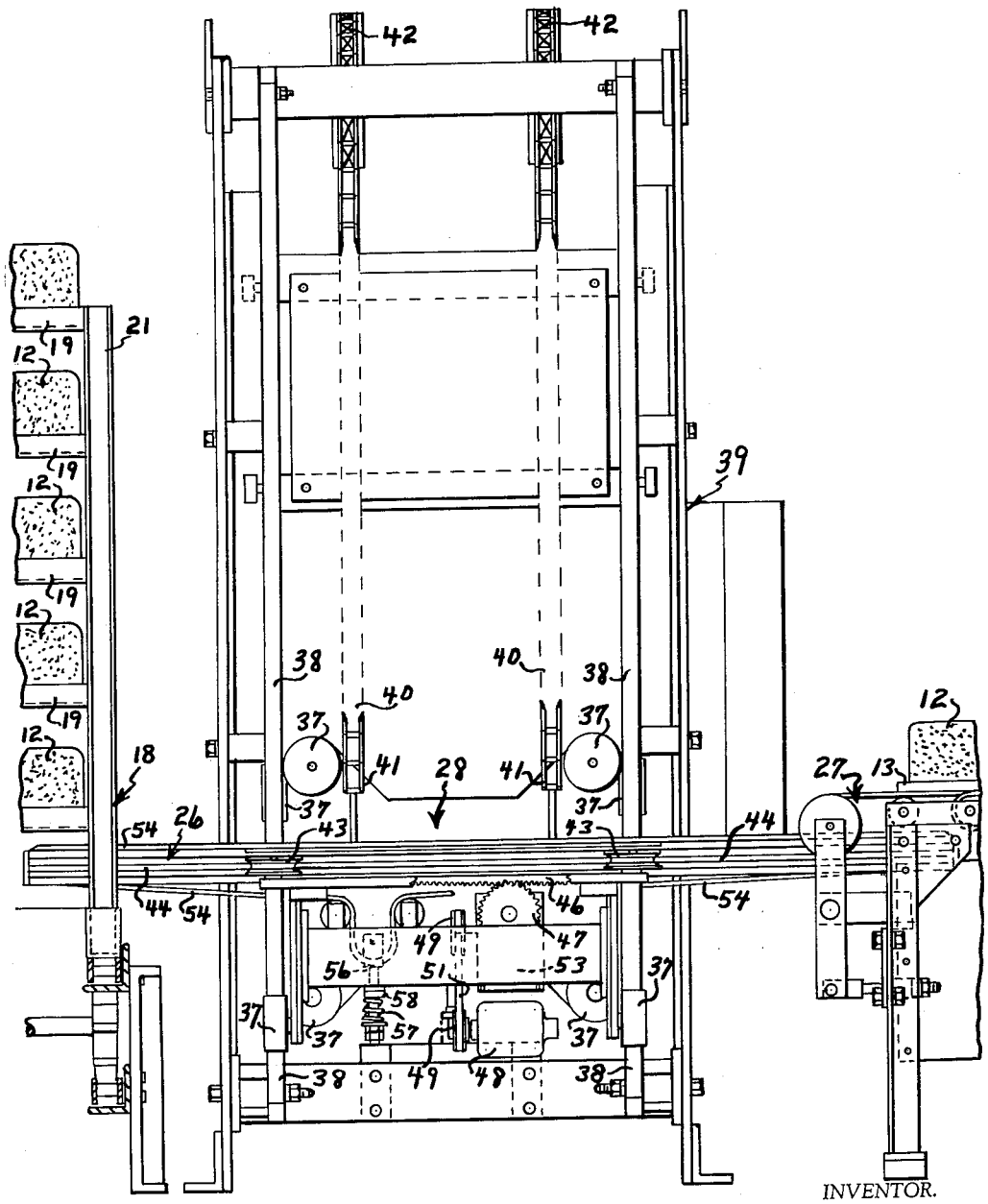

Feb. 6, 1962 R. M. GRAY 3,019,925
BLOCK HANDLING APPARATUS
Filed April 24, 1958 8 Sheets-Sheet 3
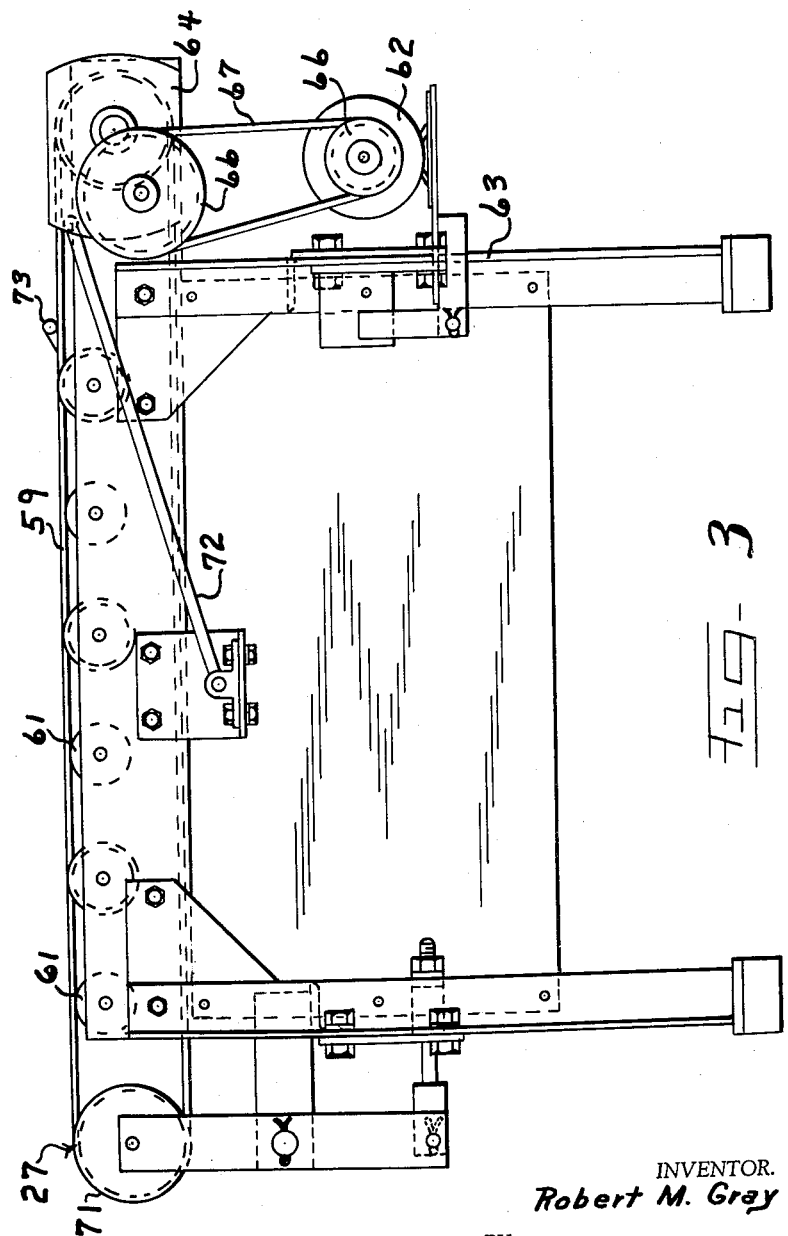
INVENTOR.
Robert M. Gray
BY
Jennings, Carter & Thompson
Attorneys

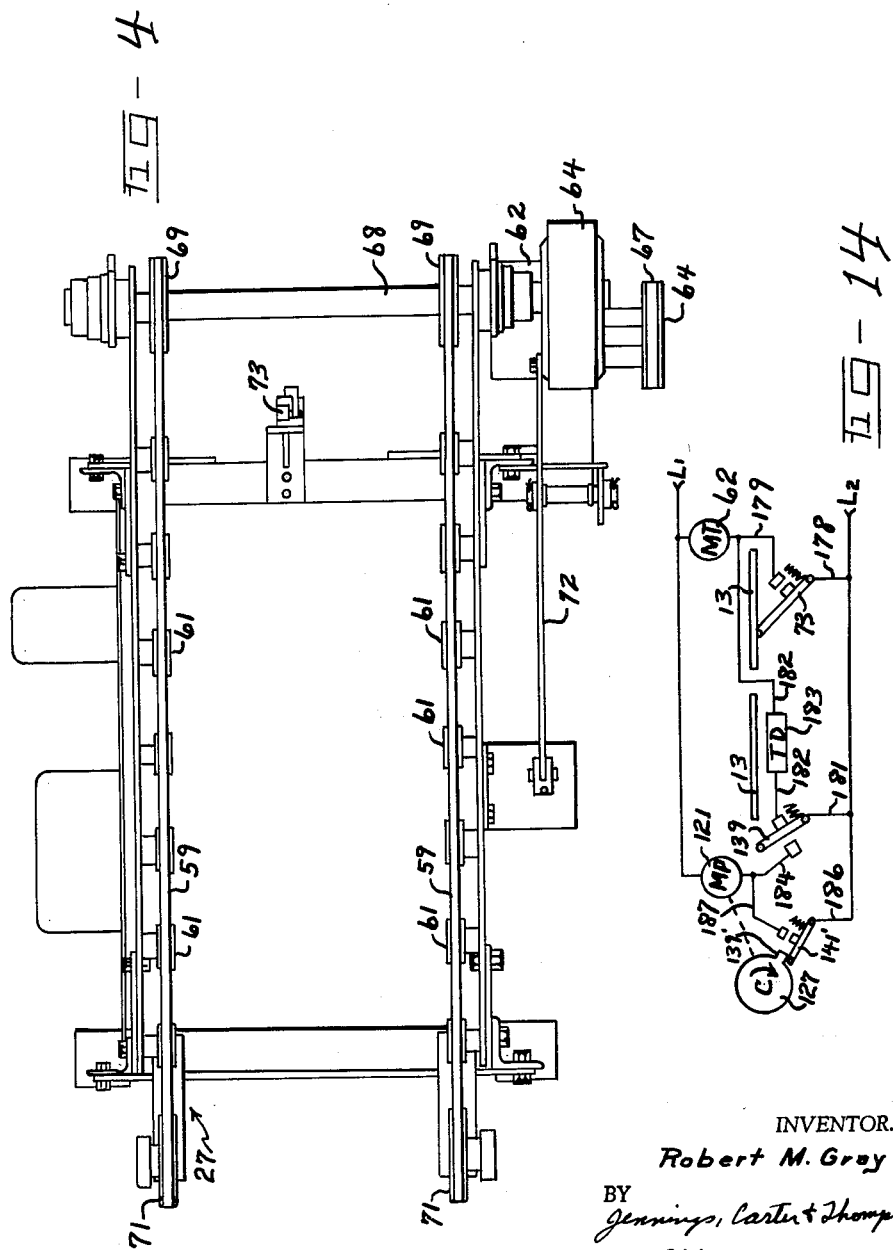

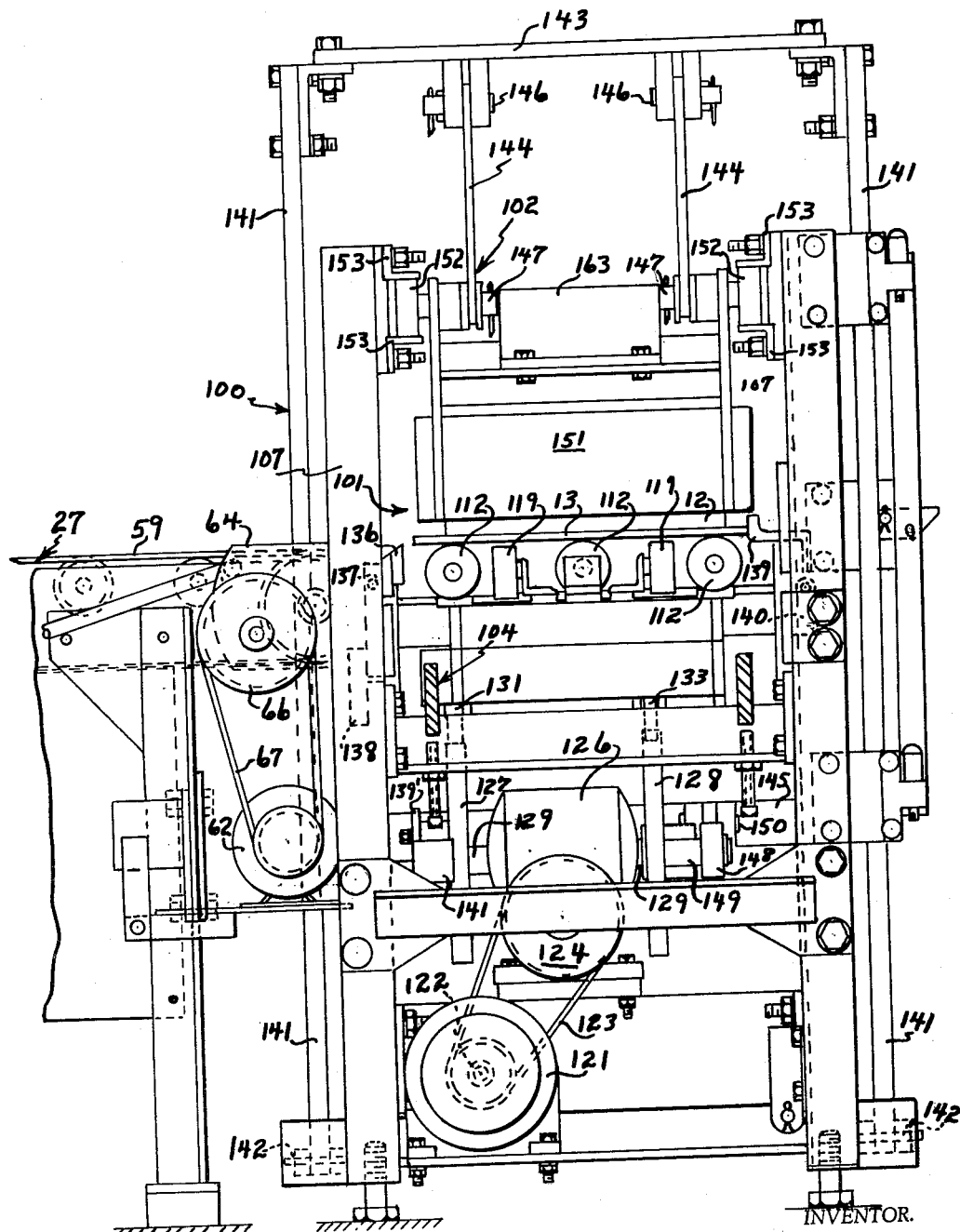

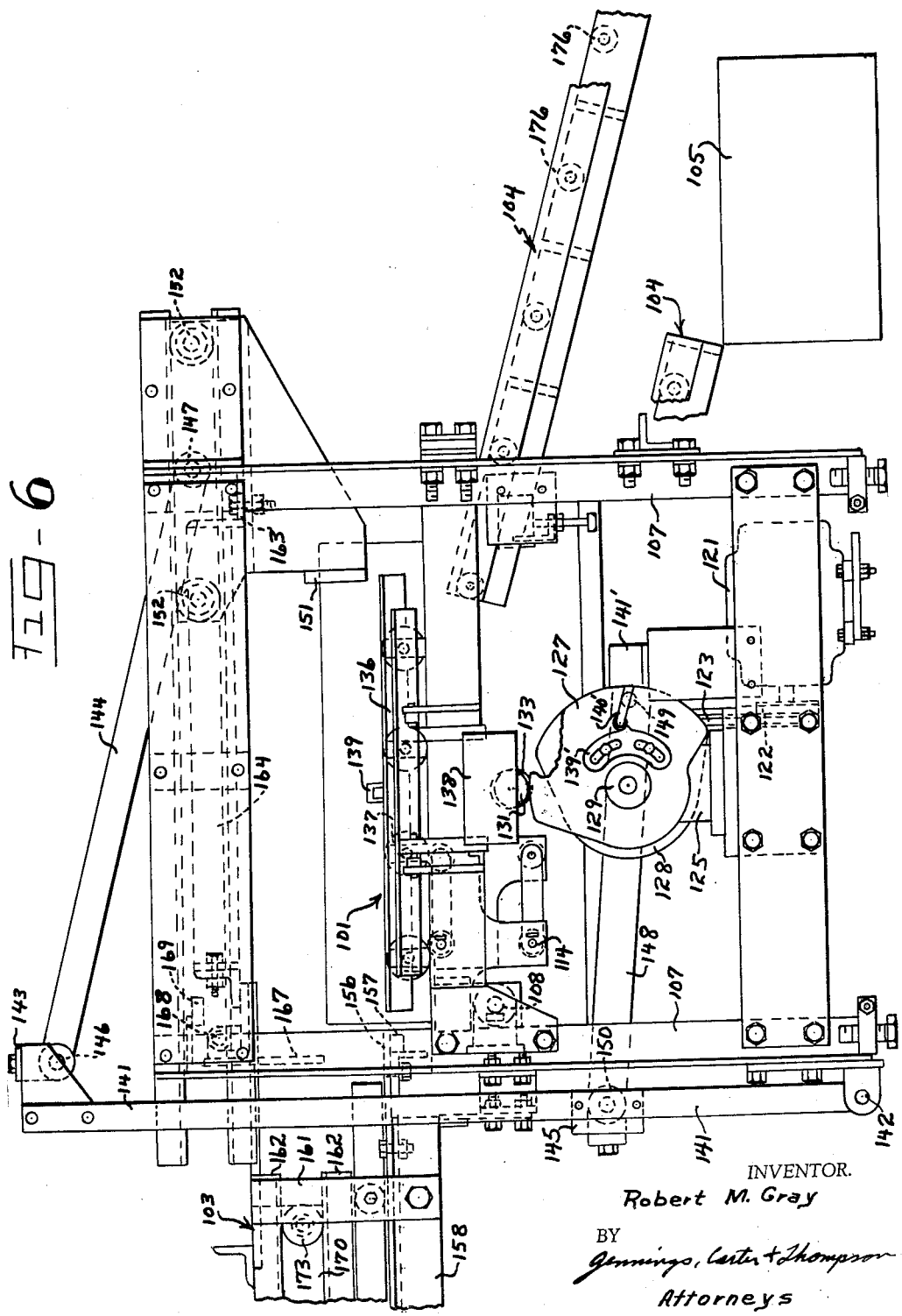

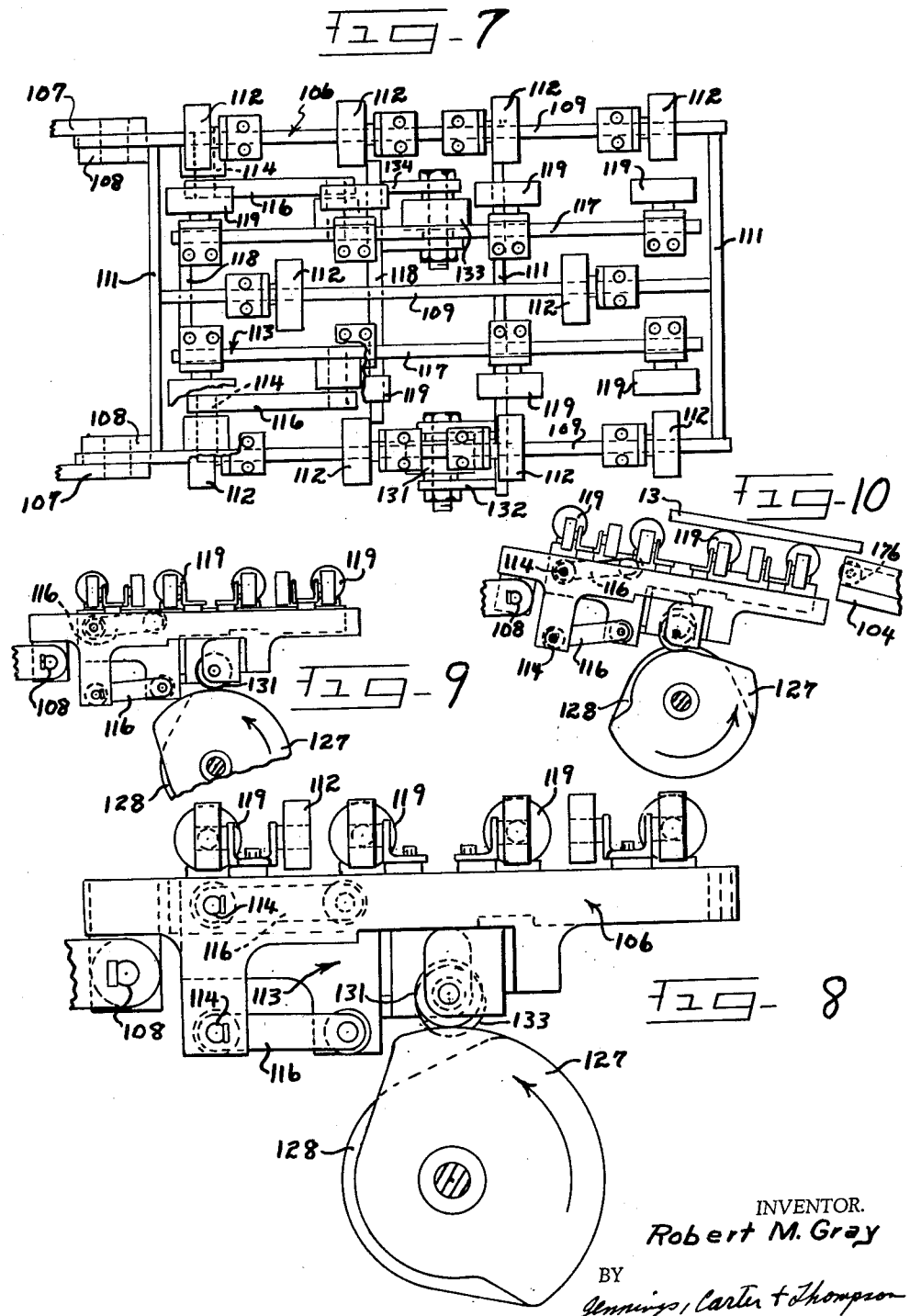

Feb. 6, 1962  R. M. GRAY  3,019,925
BLOCK HANDLING APPARATUS
Filed April 24, 1958  8 Sheets-Sheet 8
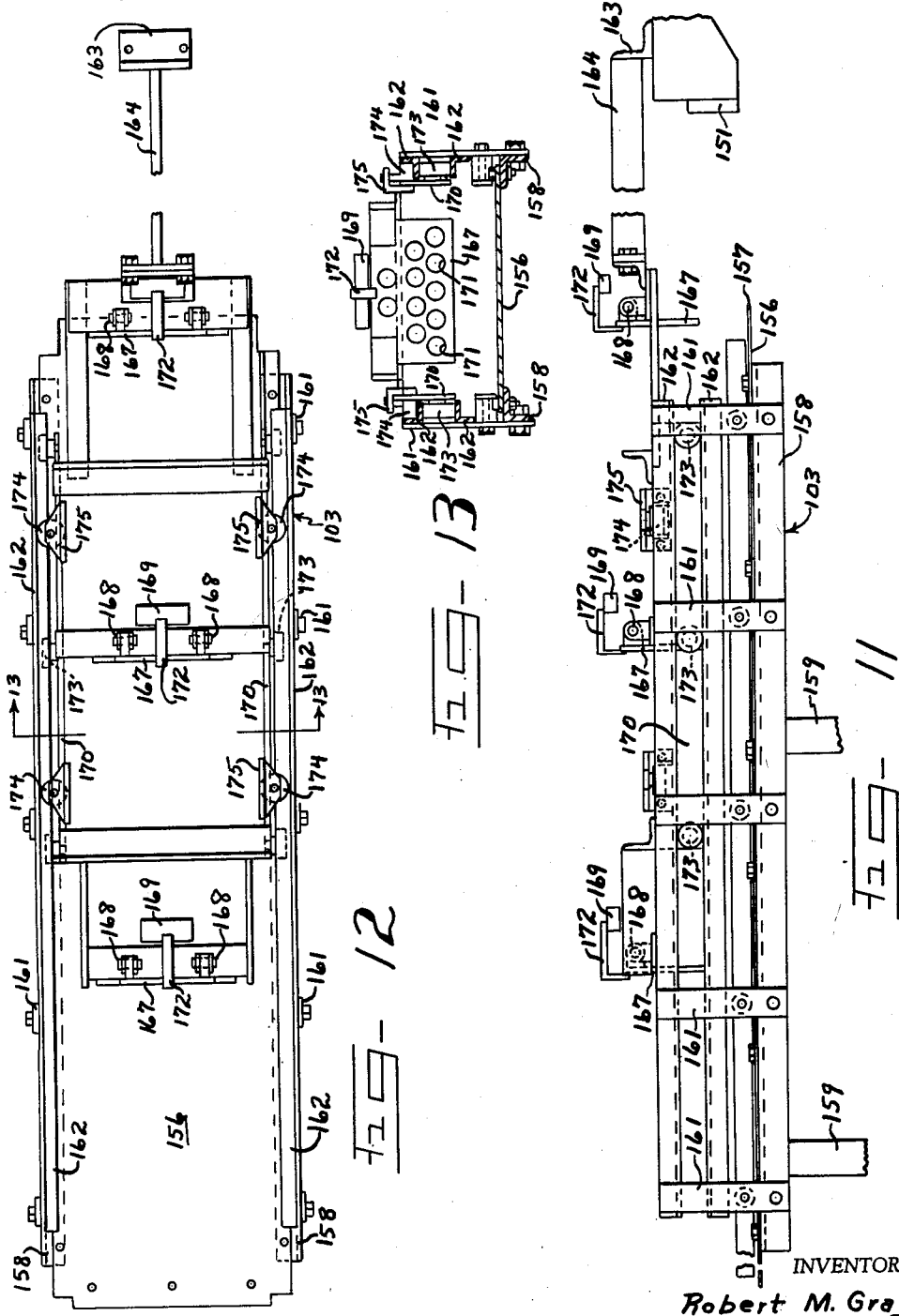
INVENTOR.
Robert M. Gray
BY Jennings, Carter & Thompson
Attorneys

United States Patent Office 3,019,925
Patented Feb. 6, 1962

3,019,925
BLOCK HANDLING APPARATUS
Robert M. Gray, Rte. 1, Sheffield, Ala.
Filed Apr. 24, 1958, Ser. No. 730,611
14 Claims. (Cl. 214—310)

This invention relates to apparatus for handling blocks and the like as they are taken from a kiln, and more particularly to means for separating blocks from the pallets on which they are supported after the blocks have been cured.

Heretofore, cured concrete blocks taken from the kiln have been removed from the pallets by hand, or the pallets with the concrete blocks thereon have been transferred directly to a horizontal conveyor on which the blocks are removed from the pallets.

By the present invention, racks having a plurality of superposed loaded pallets thereon are transferred, preferably by a lift truck, from the kiln to a transverse rack conveyor on which the loaded racks are positioned. A shuttle conveyor that telescopes beneath the pallets in the racks is provided for transferring the loaded pallets from the racks. The shuttle conveyors may be raised and lowered for transferring the pallets loaded with blocks from the racks to a horizontal transfer conveyor on which the loaded pallets are conveyed to pallet unloading means. The pallet unloading means removes the concrete blocks from the pallets and discharges the blocks from one side of the unloading means and returns the pallets to a supply hopper or magazine of the block making machine. From the time the blocks leave the kiln until they are discharged by the pallet unloading means, no manual handling is necessary.

It is an object of the present invention to provide, in combination with pallet unloading means, a vertically movable shuttle conveyor that unloads loaded pallets from racks having multiple shelves, and a transfer conveyor on which the loaded pallets are moved by the shuttle conveyor and which, in turn, moves the pallets to the pallet unloading apparatus.

It is a further object of the invention to provide pallet unloading apparatus comprising a loaded pallet receiving station having two supporting frames with pallet supporting rollers thereon, the rollers on one frame being disposed to convey the loaded pallets into the receiving station and the rollers on the other frame being disposed to convey the pallets out of the receiving station at right angles to the path of movement thereinto. The other frame is vertically movable relative to the first frame, thereby causing the rollers on the other frame to support the pallet when raised above the rollers on the first frame. Further, the frames are arranged so that an end thereof pivots downwardly permitting empty pallets to roll downwardly into the pallet magazine of the block machine.

It is a further object of the present invention to provide reciprocating means for removing the concrete blocks from the pallets comprising a pusher member that engages the rear side of the blocks on the forward stroke of the reciprocatory means.

Briefly described, my improved pallet unloading means comprises an upstanding main frame on which a loaded pallet receiving station is provided by a pair of roller beds embodying a plurality of rollers on separate frames. The rollers on one frame are disposed perpendicularly to the rollers on the other frame and the frames are disposed for relative vertical movement so that the rollers on one frame may be disposed above or below the rollers on the other frame for selectively supporting the loaded pallets thereon. A camshaft having a pair of cams thereon is mounted on the main frame with one cam operatively connected to actuate one roller frame and the other cam operatively connected to actuate the other roller frame. Reciprocating pusher means is driven by one of the cams and pushes the blocks off the pallets while the pallets are supported at the receiving station by some of the rollers. After the removal of the concrete blocks from the pallets, an end of the supporting frames moves downwardly and the pallet at the receiving station rolls downwardly along a discharge conveyor into the pallet magazine or hopper of the block making machine. A block discharge section is provided adjacent the receiving station on which the blocks are discharged. Horizontal members on the discharge section provide tracks for rollers carried by the reciprocating means and thereby provide means for supporting and guiding the movement of the reciprocating means. A switch at the receiving station is actuated at the receiving station by the movement of the pallets to energize the drive means for the camshaft. A limit switch, operable responsive to the rotation of the camshaft, deenergizes the drive means for the camshaft upon completion of a cycle of operation as will be described.

Apparatus embodying features of my invention is illustrated in the accompanying drawings, forming a part of this application, in which:

FIG. 2 is an elevational view of the vertically movable shuttle conveyor for moving the loaded pallets from racks on which they are positioned to a transfer conveyor;

FIG. 3 is a side elevational view of the transfer conveyor on which the loaded pallets are delivered from the shuttle conveyor shown in FIG. 2;

FIG. 4 is a top plan view of the transfer conveyor shown in FIG. 3;

FIG. 5 is a side elevational view of the pallet unloading means disposed at the discharge end of the transfer conveyor shown in FIGS. 3 and 4 for receiving loaded pallets therefrom and showing an empty pallet at the receiving station of the pallet unloading means, the discharge section for the pallets being shown in section;

FIG. 6 is a front end elevational view of the pallet unloading means shown in FIG. 5 and showing the actuating means therefor with a pallet discharge conveyor on one side of the receiving station and a block discharge section on the other side of the receiving station;

FIG. 7 is a fragmentary, top plan view of the supporting roller frames at the receiving station of the pallet unloading means shown in FIGS. 5 and 6 for supporting the pallets thereat;

FIG. 8 is a fragmentary, elevational view of the cam means for actuating the supporting frames shown in FIG. 7 and showing the position of the frames as the loaded pallet is initially received at the receiving station, the rollers on an outer supporting frame being disposed higher than the rollers on the inner supporting frame;

FIG. 9 is a fragmentary, elevational view of the cam means shown in FIG. 8 and showing the position of the roller frames as the concrete blocks are being separated from the pallet with the rollers on the inner supporting frame being disposed higher than the rollers on the outer supporting frame;

FIG. 10 is a fragmentary, elevational view of the cam means shown in FIGS. 8 and 9 with both the inner and outer supporting frames at the receiving station having an end thereof pivoted downwardly for discharging an empty pallet from the receiving station onto a discharge conveyor after the blocks have been removed therefrom;

FIG. 11 is a fragmentary, side elevational view of the block discharge section disposed adjacent the pallet unloading means for receiving the blocks after they are removed from the pallet and partially showing the reciprocating means for moving the blocks along the discharge section;

FIG. 12 is a top plan view of the block discharge section shown in FIG. 11;

FIG. 13 is a cross sectional view taken along the line 13—13 of FIG. 12; and

FIG. 14 is a schematic wiring diagram of the controls for the pallet unloading means and the transfer conveyor.

Figure 1:
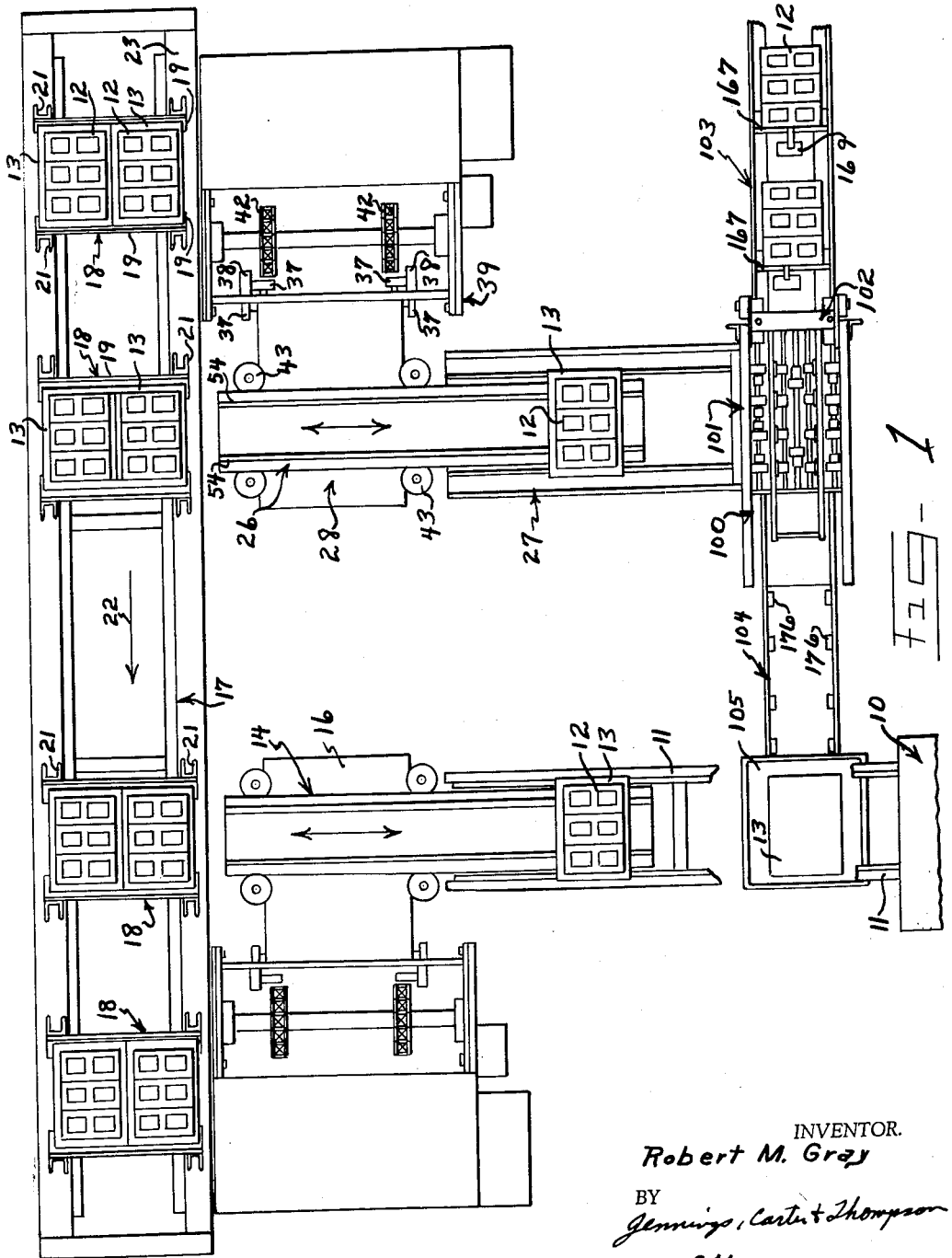
FIG. 1 is a diagrammatic plan view of a concrete block making plant embodying my apparatus for moving and unloading pallets after the pallets with concrete blocks thereon are delivered from a kiln.

Referring now to the drawings for a better understanding of my invention, I show in FIG. 1 a concrete block making plant embodying a block making machine indicated generally by the numeral 10 and having a transfer conveyor 11 for conveying pallets loaded with concrete blocks from the block machine 10, the transfer conveyor 11 shown partly broken away in FIG. 1. The concrete blocks 12 are supported, preferably in groups of three, on pallets 13 which are, in turn, supported on the transfer conveyor 11. A shuttle conveyor, indicated generally by the numeral 14, is disposed adjacent the discharge end of the transfer conveyor 11 and is mounted on an elevator 16 which is movable vertically. The shuttle conveyor 14 is movable horizontally and thus may be moved from the transfer conveyor 11 to a rack conveyor 17 on which a plurality of removable racks 18 is mounted for loading loaded pallets thereon from the transfer conveyor 11.

As shown in FIG. 2, each rack 18 comprises a plurality of horizontal angles 19 connected to vertical channel members 21 in superposed relation to form shelves for the loaded pallets 13. The transfer conveyor 11 comprises spaced sides so that the shuttle conveyor 14 may move therebetween under the loaded pallets 13, and then may be raised to engage the underside of the loaded pallets for removing them from the conveyor 11. The racks 18 have spaced open sides also so that the shuttle conveyor 14 can move inwardly of the racks and position the loaded pallets 13 on the horizontal angles 19 which form inward projections on the racks 18. The shuttle conveyor 14 normally moves two loaded pallets 13 at one time from the transfer conveyor 11 to the racks 18. The racks 18 are loaded from the top to the bottom and after the racks are loaded, the rack conveyor 17 will move one step in the direction of the arrow 22 and an empty rack 18 will be positioned adjacent the discharge end 23 of the shuttle conveyor 14.

Suitable means, such as a lift truck, may be used for transferring the loaded racks to a kiln (not shown) in which the blocks remain for approximately 24 hours for curing. Then, the entire rack with the loaded pallets thereon is taken from the kiln by suitable means, such as a lift truck, to the end 23 and is positioned thereon in detachable relation for movement at predetermined intervals along the conveyor 17.

A second shuttle conveyor, indicated generally by the numeral 26, is mounted adjacent the racks 18 on conveyor 17 and is adapted for telescoping between the sides of racks 18 and engaging the underside of a loaded pallet 13 with cured blocks thereon to lift the pallet and move it along the conveyor 26 to the receiving end of a transfer conveyor indicated by the numeral 27. The shuttle conveyor 26 is movable horizontally and is mounted on an elevator 28 that is movable vertically. The transfer conveyor 27 has spaced sides open at the top thereof so that the shuttle conveyor 26 may be disposed therebetween for depositing loaded pallets thereon.

The loaded pallets 13 are transferred by conveyor 27 to the pallet unloading means 100 having a receiving station 101 to which the loaded pallets 13 are delivered from conveyor 27. After the loaded pallets are positioned at the receiving station 101, reciprocating pusher means 102 engages a side of the blocks 12 and pushes them from the pallet 13 onto a block discharge section 103. After the concrete blocks are moved to the discharge section 103, the empty pallets 13 at the receiving station 101 are rolled downwardly along a pallet discharge conveyor 104 to a pallet magazine or hopper 105 which supplies the pallets for the block making machine 10.

Referring now to FIG. 2, I show the shuttle conveyor 26 employed for taking loaded pallets 13 from the racks 18 and delivering them to the transfer conveyor 27. The vertically movable elevator 28 has rollers 37 adapted for riding along the vertical guides 38 which are secured to a fixed upstanding frame indicated generally by the numeral 39. A pair of roller chains 40 is secured at 41 to the elevator 28 and extends over the sprockets 42 mounted on the upper portion of the fixed frame 39. The other end (not shown in the drawings) of the chains 40 is attached to a drum which is driven for raising the elevator 28 while being guided along the guides 38 on rollers 37. The elevator 28 is counterweighted so that it may be easily lowered along with any material that may be thereon.

The shuttle conveyor 26 is mounted on the elevator 28 for vertical movement therewith and for horizontal movement relative to the elevator 28. For this purpose, pulleys 43 are mounted on each side of the shuttle conveyor 26 for guiding and partially supporting the shuttle conveyor. A lateral guiderail 44 is disposed on each side of the shuttle conveyor 26 and rides in the groove of the pulleys 43 that are pivotally mounted mounted on the elevator 28. For moving the shuttle conveyor 26 horizontally, a rack 46 is secured to the underside thereof and a pinion 47 is mounted on the elevator 28 for engaging rack 46. The pinion 47 is driven by motor 48 and pulleys 49 connected through a V-belt 51. The upper pulley 49 is connected to a gear reducer 53 which drives the pinion 47. The entire drive means for the pinion 47 is mounted on the elevator 28 and moves vertically therewith.

A pair of vertically spaced belts 54 is arranged on the shuttle conveyor 26 for moving the loaded pallets along the conveyor and is supported by rollers (not shown) mounted on conveyor 26. The loaded pallets 13 rest on top of the pair of belts 54. The belts 54 are not driven mechanically but are gripped in securing relation by a yoke 56 which is resiliently mounted on elevator 28 by spring 57 between an end of yoke 56 and a bearing 58 secured to the frame of elevator 28. It is understood that a yoke 56 is provided for each of the belts 54. Upon movement of the shuttle conveyor 26 horizontally through the rack and pinion arrangement, the top surface of the belts 54 will slip and move the pallets thereon due to the gripping of the belts 54 by yokes 56. A two-to-one ratio is obtained between the horizontal movement of the shuttle conveyor 26 and the movement of the top surface of the belts 54 as the top supporting surface of belts 54 moves two feet for every one foot of horizontal movement by the shuttle conveyor 26. By this arrangement, the position of the belt 54 may be accurately determined by the position of the shuttle conveyor 26, and an automatic timed operation of the shuttle conveyor 26 for transferring blocks from the racks 18 to the transfer conveyor 27 may be maintained.

Referring now to FIGS. 3 and 4, in which the transfer conveyor 27 is shown, a pair of spaced belts 59 is shown mounted on a plurality of rollers 61 extending between the upper and lower runs of the belts 59. Loaded pallets 13 are placed on the top surface of the belts 59 by the shuttle conveyor 26 and are moved along the transfer conveyor 27 to the pallet unloading means 100. The belts 59 are driven in the following manner. A motor 62 is secured to the upstanding frame 63 resting on a floor or other supporting structure. Motor 62 is connected to a gear reducer 64 through pulleys 66 and pulley belt 67. A counter shaft 68 is driven by the gear reducer 64 and has drive pulleys 69 mounted thereon for driving the belts 59. A pair of idler pulleys 71 support the belts 59 on the end of the transfer conveyor 27 opposite that on which the pulleys 69 are arranged. A brace 72 is connected at one end of the gear reducer 64 and at the other end to the frame 63 for holding the gear reducer 64 in fixed position and to take the torque reaction thereof. Means operable responsive to the movement of the pallets and comprising a switch 73 is positioned on conveyor 27 for controlling motor 62 as will be explained in detail later. A movable arm of switch 73 extends above the top level of the belts 59 so that the switch 73 will be actuated by a loaded pallet 13 being conveyed along the belts 59.

Referring now to FIGS. 5 and 6 in which the pallet unloading means 100 is shown, loaded pallets 13 are discharged from the conveyor 27 at the receiving station 101 of the pallet unloading means. A pair of supporting roller frames is arranged at the receiving station 101 for supporting the loaded pallets 13 thereat. An outer frame 106 (also see FIG. 7) is pivotally mounted at 108 to the fixed upstanding frame 107 of the pallet unloading means 100. The outer frame 106 comprises longitudinal frame members 109 connected by cross members 111, the longitudinal members 109 having rollers 112 mounted thereon for rotation about a horizontal axis. An inner supporting frame 113 is pivotally connected at 114 to the outer frame 106 through parallel links 116 arranged on each side of the inner supporting frame 113 to form a parallelogram arrangement. Movement of the inner frame 113 relative to the outer frame 106 is in parallel vertical relation. The inner frame 113 comprises longitudinal frame members 117 connected by cross members 118. Rollers 119 are secured to the longitudinal members 117 for rotation about a horizontal axis in a perpendicular relation to the rollers 112. As shown in FIG. 5, the rollers 112 on the outer frame 106 are raised approximately one-fourth of an inch above the rollers 119 on the inner frame 113 and are in position for initially receiving a loaded pallet 13 at the receiving station 101.

For actuating the inner frame 113 and the outer frame 106, a motor 121 is provided for driving a pair of pulleys 122. (See FIG. 6.) A pair of pulley belts 123 is arranged over the pulleys 122 and extends over a pair of pulleys 124 for driving the gear reducer 126. The gear reducer 126 drives camshaft 129 on which is mounted an outer frame cam 127 and an inner frame cam 128. The outer supporting frame 106 has a cam roller 131 (see also FIG. 7) mounted thereon by a bracket 132 and adapted for engaging the upper outer surface of cam 127. The inner frame 113 has a cam roller 133 mounted thereon by bracket 134 and adapted for engaging the upper outer surface of cam 128. Thus, the inner frame 113 may be moved vertically relative to the outer frame 106 by cam 128 engaging the cam roller 133 on inner frame 113 and moving frame 113 about the pivots 114.

A loaded pallet 13 being discharged from the transfer conveyor 27 onto the receiving station 101 engages a stop member 136 pivotally mounted at 137 and actuated by gravity. A weight 138 is secured to an end of the stop 136 for returning the stop to its normal position after the pallet 13 has passed thereover. Thus, in the position of the stop 136 shown in FIG. 5, the loaded pallet 13 cannot move rearwardly toward the conveyor 27 as it will engage stop 136 and be restrained thereby. Actuating means 139 (see FIG. 5) for switch 140 is arranged at an end of receiving station 101 for engagement by an edge of pallet 13 when the pallet 13 is positioned at the receiving station 101. Actuation of the switch 140 actuates the motor 121 for driving the camshaft 129, as will be explained in detail below. For deenergizing the motor 121 upon each revolution of the camshaft 129, a lug 139' is secured to cam 127 (see FIG. 6) and engages switch actuating means 140' for a limit switch 141'.

For pushing the concrete blocks from the pallet 13, reciprocating pusher means 102 is provided comprising a pair of substantially vertical arms 141 pivotally connected at 142 to the upstanding frame 107 and extending above the receiving station 101. Arms 141 are connected at the upper ends thereof by a horizontal cross member 143 and intermediately thereof by cross member 145.

A pair of connected links 144 is pivotally mounted at one end to the cross member 143 by pins 146 and connected at the other end to the reciprocating pusher means 102 through the pins 147. For driving the pusher means 102, a link 148 has one end thereof pivotally mounted at 149 to a face of the inner frame cam 128 for movement therewith. The other end of link 148 is pivotally mounted at 150 to the cross member 145 which extends between arms 141. Thus, upon each revolution of the cam 128, the pusher means 102 will complete one cycle. The pusher means 102 has a rear portion for pushing the blocks 12 from the receiving station 101 and a forward portion for pushing the blocks 12 along the block discharge section 103 after the blocks leave the receiving station 101. The rear portion comprises rollers 152 mounted on each side of the pusher means 102 over the receiving station 101 for riding in tracks formed between the angle members 153 on the upstanding frame 107 for the pallet unloading means 100. A pusher plate 151 is disposed on the rear portion by suitable frame members and is adapted for contacting a side of the blocks 12 at the receiving station 101 and pushing them onto the section 103.

A block discharge section 103 is mounted adjacent a side of the receiving station 101 for receiving the concrete blocks 12 as they are pushed from the pallet 13 and the receiving station 101 by the pusher plate 151. As shown in FIGS. 11, 12, and 13, the block discharge section 103 comprises a bottom plate 156 on which the concrete blocks 12 are supported after they are pushed from the pallets. The rear end 157 of the supporting plate 156 forms a stop for the pallets 13 as the blocks are being pushed from the receiving station and thereby restrains movement of the pallets onto the discharge section 104. Supporting plate 156 is mounted on support angles 158 which are, in turn, mounted on upstanding frame members 159 partially shown in FIG. 11. Side support members 161 are mounted on the angles 158 and have a pair of angles 162 mounted on each side thereof for forming a track between the angles.

Forming the forward portion of the reciprocating means 102 and connected to the rear portion thereof, an angle 163 (see FIG. 5 also) is secured to the support means for pusher plate 151 and has a connecting bar 164 welded thereto which connects the rear portion to the forward portion and moves therewith. The forward portion comprises a plurality of pusher plates 167 which are pivotally mounted at 168. The pusher plates 167 are adapted for engaging the rear side of a group of concrete blocks and for pushing them along the discharge section 103 on the supporting plate 156. The forward stroke of the reciprocating means 102 pushes the blocks slightly less than the distance between two adjacent pusher plates 167. A weight 169 is secured to each of the pivotally mounted plates so that the plates will tilt rearwardly upon contact with the forward side of the blocks on the reverse stroke of the reciprocating means 102 without any damage to the concrete blocks or without knocking the concrete blocks over. In order to decrease the weight of the pivotally mounted plates 167, a plurality of holes 171 (see FIG. 13) is provided in each of the pusher plates 167. The weights 169 are connected to the pusher plates 167 by arms 172 welded thereto.

Rollers 173 are mounted on a horizontal axis on slide plates 170 of the reciprocating means 102 and ride in the track formed between the angles 162 and are supported and partially guided thereby. Rollers 174 are mounted on a vertical axis on brackets 175 attached to the slide plates 170 and ride along the upper angle 162 forming the track thereby aiding in guiding the reciprocating means. Thus, upon each revolution of the cam 128, the reciprocating means 102 makes a complete cycle through actuation of the link 148, parallel arms 141 and the connecting link 144. The pusher plate 151 pushes the concrete blocks from the pallet at the receiving station 101, and the pusher blades 167 push the blocks which have been previously removed from the receiving station by the pusher plate 151 along the discharge section 103 in successive steps.

The pallet 13 remains at the receiving station 101 after the concrete blocks have been removed therefrom and referring now to FIG. 10, it will be seen that the frames 106 and 113 pivot downwardly about the pivot 108 thereby lowering one end of the frames. Thus, the pallet 13 rolls off the rollers 119 at the receiving station onto the pallet discharge section 104 (see FIGS. 1 and 6 also) having rollers 176 thereon and thence to the supply hopper or magazine 106 of the block making machine 10. The frames 106 and 113 return to the position shown in FIG. 8 for receiving a loaded pallet 13 from the transfer conveyor 27 and repeating the cycle.

Referring now to FIG. 14 for the operation of my improved apparatus and beginning with a loaded pallet 13 on the receiving end of the transfer conveyor 27, the loaded pallet 13 moves along the conveyor 27 until it contacts switch 73. Upon contacting switch 73, the motor 62 for the conveyor 27 is deenergized as shown in FIG. 14 and thus, the loaded pallet 13 stops on conveyor 27. As long as the switch 73 is not engaged by a loaded pallet 13, the motor 62 is energized through the lines 178 and 179, the lines $L_1$ and $L_2$ indicating the source of energy. After an empty pallet 13 is discharged from the receiving station 101, the switch actuating means 139 at the receiving station moves to the position shown in FIG. 14 and energizes the motor 62 through lines 181 and 182. Since there is a time interval between the time that the pallet 13 moves out of engagement with the switch means 139 and the time that the supporting frames 106 and 113 return to the position shown in FIG. 8, a time delay 183 is disposed in line 182 between the switch means 139 and the motor 62. Thus, time is allowed for the frames 106 and 113 to return to pallet receiving position before the motor 62 is energized. Upon energizing the motor 62, a loaded pallet is moved from the transfer conveyor 27 to the receiving station 101 and motor 62 remains energized until the switch 139 is engaged by a loaded pallet 13. Upon engagement of switch 139 by a loaded pallet 13, the motor 62 is deenergized thereby ceasing the movement of conveyor 27 until switch 73 is again opened. The engagement of switch means 139 by pallet 13 energizes motor 121 through lines 181 and 184. The energizing of motor 121 rotates the cam 127 and the cam lug 139' disengages the switch means 141 thereby providing a holding circuit for the motor 121 through lines 186 and 187. The rotation of cam 127 and 128 from the position shown in FIG. 8 moves the inner supporting frame 113 so that the rollers 119 thereon are disposed at a greater height than the rollers 112, as shown in FIG. 9. With the cams 127 and 128 in the position shown in FIG. 9, the reciprocating means 102 begins its forward stroke and the pusher plate 151 moves the blocks at the receiving station from the pallet 13. After the blocks have been removed from the pallet 13, the reciprocating means 102 starts its reverse stroke and the frames 106 and 113 pivot downwardly about the pivot 108 as shown in FIG. 10, and the pallet 13 is removed from the receiving station 101. When the pallet 13 leaves the receiving station, switch means 139 returns to the position shown in FIG. 14 to energize the motor 62. The holding circuit through lines 186 and 187 is maintained to energize motor 121 until the lug 139' on cam 127 engages the switch means 141' upon a complete revolution of cam 127. Thus, the motor 121 is deenergized upon a complete revolution of cam 127 and remains deenergized until a loaded pallet 13 engages the switch 139 at which time it is energized again for a new cycle.

From the foregoing, it will be seen that I have devised an improved block handling apparatus which automatically takes loaded pallets 13 arranged in superposed relation on racks to a pallet unloading means on which the blocks are separated from the pallets with the pallets being discharged on one side of the pallet unloading means to a pallet magazine or hopper for the block making machine, and the blocks being discharged from an opposite side of the pallet unloading means. No manual handling of the blocks or pallets is necessary from the time the loaded pallets are taken from the racks until they are separated by the pallet unloading means. The transfer conveyor 27 and the block unloading means 100 are timed so that a loaded pallet moves onto the receiving station 101 immediately after an empty pallet 13 is discharged from the receiving station 101. Thus, there is no time lost in the separating of the concrete blocks from the pallets.

Further, my improved supporting frames with pallet supporting rollers thereon are provided at the receiving station 101, and the rollers on one frame are disposed at right angles to the rollers on the other frame. An inner frame is vertically movable relative to an outer frame on which the loaded pallets are initially received at the receiving station and both frames are arranged so that an end thereof may pivot downwardly to permit empty pallets to roll or slide downwardly into a pallet magazine. I have also attached a discharge section to a side of my pallet unloading means 101 for receiving the concrete blocks as they are removed from the pallet 13. Concrete blocks are easily breakable and if a number of concrete blocks are pushed, one behind the other, breakage is frequent. Therefore, I have found that by providing a pusher plate for each group of three blocks the breakage is decreased. The pusher plates are arranged for pivoting over the following group of blocks upon the reverse stroke of the reciprocating means.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for moving and unloading pallets having a plurality of blocks thereon from a rack having a plurality of superposed shelves, a shuttle conveyor mounted for vertical and horizontal movement, means for moving the conveyor horizontally inward of the rack underneath a loaded pallet and then moving the conveyor vertically for engaging the loaded pallet, a transfer conveyor disposed adjacent the shuttle conveyor, said shuttle conveyor transferring loaded pallets from the rack to the transfer conveyor, means to drive the transfer conveyor, pallet unloading means disposed adjacent an end of said transfer conveyor and in the path of movement of the loaded pallets along the transfer conveyor into which the loaded pallets are delivered from the transfer conveyor, said pallet unloading means comprising means for pushing the blocks from the pallets in a direction generally at right angles to the direction of the loaded pallets along the transfer conveyor on one side of the unloading means and means for removing the empty pallets from the opposite side of the unloading means, and control means to energize said drive means for the transfer conveyor upon removal of an empty pallet at the unloading means whereby a loaded pallet is moved onto the unloading means.

2. In apparatus for separating blocks from pallets supported on a rack having at least one upper and one lower shelf formed by lateral projections on opposite sides of the rack for engaging the pallets, a horizontally reciprocable shuttle conveyor embodying means to extend the conveyor into the rack between the projections and beneath a pallet, means to raise and lower the shuttle conveyor while extended into the rack, a pallet transfer conveyor disposed adjacent the shuttle conveyor, said shuttle conveyor moving the loaded pallets from the rack onto the transfer conveyor, means to drive said transfer conveyor pallet unloading means disposed adjacent an end of said transfer conveyor in the path of movement of the loaded pallets along the transfer conveyor into which the loaded pallets are delivered from the transfer conveyor, said pallet unloading means comprising means for removing the blocks from the pallets in a direction generally at right angles to the direction of the loaded pallets along the transfer conveyor on one side of the unloading means and placing the blocks on a discharge conveyor, means for removing the empty pallets from the opposite side of the unloading means, and control means to energize said drive means for the transfer conveyor upon removal of an empty pallet at the unloading means whereby a loaded pallet is moved onto the unloading means.

3. In apparatus for removing blocks from pallets, a receiving station for receiving loaded pallets, a pivotally mounted frame at said station having rollers thereon on which the loaded pallets are initially received, a second pivotally mounted frame disposed under the loaded pallets at the receiving station and having rollers thereon arranged perpendicularly to the rollers on said first mentioned frame, the rollers on said second frame being disposed at a height below the height of the rollers on said first mentioned frame when the loaded pallets are received by the receiving station and thereby being out of contact with the pallets, means operable responsive to the movement of said loaded pallets onto the station for raising the second frame so that the rollers thereon are at a height above the rollers on the first mentioned frame and support the loaded pallets, means operable responsive to the arrival of loaded pallets at said station for removing the blocks from the pallets, and means for lowering one end of said frames whereby the empty pallets move downwardly by gravity and are thereby removed from the receiving station.

4. In apparatus for unloading blocks from pallets, an upstanding main frame having a receiving station for receiving the loaded pallets, a camshaft mounted on the main frame, a pair of cams mounted on the camshaft for rotation therewith, a first frame pivotally mounted on the main frame and operatively connected to one of said cams for pivotal movement, said first frame having rollers mounted thereon for rotation about a horizontal axis and on which the loaded pallets are initially received at the receiving station, a second pivotally mounted frame disposed under the loaded pallets at the receiving station and having rollers thereon arranged for rotation about a horizontal axis perpendicularly to the rotation of the rollers on said first frame and disposed at a height below the height of the rollers on said first frame when the loaded pallets are received at the receiving station, said second frame being operatively connected to the other of said pair of cams for pivotal movement, means for driving the camshaft and pivoting said second frame whereby the rollers on said second frame may be disposed at a height above the rollers on said first frame and contact the loaded pallets for supporting same after the loaded pallets have been received at the receiving station, reciprocating means at the receiving station to remove the blocks from the pallets while the rollers on said second frame are disposed at a height above the rollers on said first frame, and means to remove the empty pallets from the receiving station after the blocks have been removed.

5. In apparatus for unloading concrete blocks and the like from pallets, an upstanding main frame having a receiving station for receiving the loaded pallets, a camshaft mounted on the main frame, a pair of cams mounted on the camshaft for rotation therewith, a first frame pivotally mounted on the main frame and operatively connected to one of said cams for pivotal movement, said first frame having rollers mounted thereon for rotation about a horizontal axis and on which the loaded pallets are initially received at the receiving station, a second pivotally mounted frame disposed under the loaded pallets and having rollers thereon arranged for rotation about a horizontal axis perpendicular to the rotation of the rollers on said first frame and disposed at a height below the height of the rollers on said first frame when the loaded pallets are received at the receiving station, means for driving the camshaft, means operable responsive to the movement of each loaded pallet at the receiving station for energizing said drive means and rotating the camshaft, means operable responsive to each rotation of the camshaft for deenergizing said drive means, the rotation of the camshaft and cams thereon pivoting said second frame whereby the rollers on said second frame are disposed at a height above the rollers on said first frame for supporting the loaded pallets, reciprocating means at the receiving station to remove the blocks from the pallets while the rollers on said second frame are disposed at a height above the rollers on said first frame, and means to remove the empty pallets from the receiving station after the blocks have been removed.

6. In apparatus for unloading concrete blocks and the like from pallets, a main frame having a receiving station for receiving loaded pallets, a vertically movable first frame at said station having rollers thereon on which the loaded pallets are initially received, a second vertically movable frame disposed under the loaded pallets at the receiving station and having rollers thereon arranged perpendicularly to the rollers on said first mentioned frame, the rollers on said second frame being disposed at a height below the height of the rollers on said first frame when the loaded pallets are received at the receiving station, a camshaft mounted on said main frame, means for driving said camshaft, cam means on said camshaft for moving said second frame vertically and disposing the rollers thereon at a height above the rollers on said first frame for supporting the loaded pallets thereon, reciprocating means operable responsive to the rotation of said camshaft for removing the concrete blocks from the pallets after the rollers on said second frame are disposed at a height above the rollers on said first frame, and means to remove the empty pallets from the receiving station by gravity.

7. In apparatus for unloading concrete blocks and the like from pallets, a main frame having a receiving station for receiving loaded pallets, a vertically movable first frame at said station having rollers thereon on which the loaded pallets are initially received and supported, a second vertically movable frame disposed under the loaded pallets at the receiving station and having rollers thereon arranged perpendicularly to the rollers on said first mentioned frame, the rollers on said second frame being disposed at a height below the height of the rollers on said first mentioned frame when the loaded pallets are received at the receiving station, a camshaft mounted on said main frame, means for driving said camshaft, cam means on said camshaft for moving said second frame vertically and disposing the rollers thereon at a height above the rollers on said first frame for supporting the loaded pallets thereon, reciprocating means operable responsive to the rotation of said camshaft for pushing the concrete blocks from the pallets, stop means at said receiving station adjacent an edge of said pallets for restraining movement of the pallets as the concrete blocks are removed therefrom, means operable responsive to the movement of the loaded pallets for energizing the drive means and rotating the camshaft, and means operable responsive to each rotation of the camshaft for deenergizing said drive means.

8. In apparatus for unloading concrete blocks from pallets, a main frame having a receiving station for receiving the loaded pallets, a camshaft mounted on the main frame, cam means mounted on the camshaft for rotation therewith, a first frame mounted on the main frame and operatively connected to said cam means, a second frame mounted on the main frame and operatively connected to said cam means for vertical movement, said first frame being disposed at a height higher than the second frame when the loaded pallets are initially received, means for driving the camshaft and moving said second frame vertically at a height above the main frame for supporting the loaded pallets, reciprocating means operable responsive to the rotation of the camshaft for pushing the concrete blocks from the pallets while the loaded pallets are at the receiving station and the second frame is at a height above the main frame, means operable responsive to the movement of each loaded pallet at the receiving station for energizing said drive means and rotating the camshaft, and means operable responsive to each rotation of the camshaft for deenergizing said drive means.

9. In apparatus for unloading concrete blocks from a pallet, a main frame having a receiving station for receiving a loaded pallet, a camshaft mounted on the main frame, a cam mounted on the camshaft for rotation therewith, a supporting frame pivotally mounted on the main frame for supporting the loaded pallet, said supporting frame comprising a pair of separately mounted frames being operatively connected to said cam for pivoting individually in a vertical plane, means for driving the camshaft, means operable responsive to the movement of each loaded pallet at the receiving station for energizing said drive means and rotating the camshaft, means operable responsive to each rotation of the camshaft for deenergizing said drive means, reciprocating pusher means operatively connected to said cam for pushing the concrete blocks from the pallet at the receiving station, and an end of said supporting frame moving downwardly after the concrete blocks have been removed from the pallet for removing the empty pallet from the receiving station.

10. In apparatus for unloading concrete blocks from pallets, a main frame having a receiving station for receiving the loaded pallets, a camshaft mounted on the main frame, cam means mounted on the camshaft for rotation therewith, a supporting frame mounted on the main frame at the receiving station for supporting the loaded pallets, said supporting frame being operatively connected to said cam means for pivoting in a vertical plane, means for driving the camshaft, means operable responsive to the movement of each loaded pallet at the receiving station for energizing said drive means and rotating the camshaft, means operable responsive to each rotation of the camshaft for deenergizing said drive means, a discharge section disposed adjacent the receiving station, reciprocating pusher means operatively connected to said cam means for pushing the concrete blocks from the pallets at the receiving station onto and along the discharge section, an end of said supporting frame moving downwardly after the concrete blocks have been removed from the pallet for removing the empty pallet from the receiving station, horizontally extending guideways along the sides of said discharge section, rollers on said reciprocating means riding in said guideways, and said reciprocating means comprising a plurality of pusher plates for engaging the rear side of the concrete blocks on the forward stroke of said means, one of said pusher plates removing the blocks from the pallets and the other of said plates moving the blocks along the discharge section in successive steps.

11. In apparatus for unloading concrete blocks from pallets, a main frame having a receiving station for receiving the loaded pallets from a kiln, reciprocating means pushing the concrete blocks from the pallets at the receiving station, a discharge section adjacent the receiving station, tracks along the sides of the discharge section, rollers mounted on a horizontal axis on both sides of said reciprocating means riding in the tracks on said discharge section for guiding and partially supporting the reciprocating means, rollers mounted on a vertical axis on both sides of said recprocating means for restraining lateral movement of the reciprocating means, a plurality of pusher plates on said reciprocating means for engaging the rear side of the blocks, one of said pusher plates pushing the blocks from the pallets and the other of said pusher plates pushing the blocks along the discharge section, the other pusher plates being pivotally mounted for pivoting out of the path of the blocks on the reverse stroke of the reciprocating means.

12. In apparatus for removing concrete blocks from pallets, a transfer conveyor on which loaded pallets are delivered, pallet unloading means disposed adjacent an end of the transfer conveyor and having a receiving station at which the loaded pallets are delivered from the transfer conveyor in the path of movement of the loaded pallets along the transfer conveyor, reciprocatory means at said receiving station for removing the concrete blocks from a pallet in a direction generally at right angles to the direction of the loaded pallets along the transfer conveyor on one side of the receiving station, means for driving said transfer conveyor, means for driving said reciprocatory means, means operable responsive to the movement of a pallet on said transfer conveyor for deenergizing the drive means thereof, switch means operable responsive to the arrival of a loaded pallet at the receiving station for energizing said drive means for the reciprocatory means whereby the concrete blocks are removed from the pallet, means for discharging the empty pallet from the opposite side of the receiving station, said switch means at said receiving station being operable responsive to the discharge of the empty pallet for energizing said drive means for said transfer conveyor independently of the operable responsive means on the transfer conveyor whereby a loaded pallet is delivered to the receiving station from the transfer conveyor immediately upon discharge of the empty pallet.

13. In apparatus for removing concrete blocks from pallets, a transfer conveyor on which loaded pallets are delivered, a main frame having a receiving station thereon disposed adjacent the transfer conveyor adapted for receiving loaded pallets from the transfer conveyor, a camshaft mounted on the main frame, a cam mounted on the camshaft for rotation therewith, a supporting frame pivotally mounted on the main frame at the receiving station, said supporting frame being operatively connected to said cam for pivoting in a vertical plane, reciprocating means driven by said cam for removing the concrete blocks from the pallets at the receiving station, means for driving said transfer conveyor, means for driving the camshaft, switch means operable responsive to the movement of a pallet on said transfer conveyor for deenergizing the drive means thereof, switch means operable responsive to the arrival of a loaded pallet at the receiving station for energizing the drive means for the camshaft whereby the concrete blocks are removed from the pallet at the receiving station by said reciprocating means, an end of said supporting frame being movable downwardly upon each cycle of the camshaft after removal of the blocks for discharging the empty pallet from the receiving station, said switch means at said receiving station being operable responsive to the discharge of the empty pallet for energizing the drive means for the transfer conveyor independently of the switch means on the transfer conveyor whereby a loaded pallet is delivered to the receiving station from the transfer station.

14. In apparatus for moving and unloading pallets loaded with material and stacked in superposed relation, a shuttle conveyor adapted selectively to move under and lift the pallets one level at a time and subsequently to withdraw them from the stack, a transfer conveyor disposed adjacent the discharge end of the shuttle conveyor, means to move the shuttle conveyor over the transfer conveyor and thence below the lever thereof thereby to deposit the pallets onto the transfer conveyor, means to drive the transfer conveyor, pallet unloading means located adjacent an end of the transfer conveyor on which the loaded pallets are delivered, means for removing the material from the pallets, means for removing the empty pallets from the unloading means, and control means to energize the drive means for the transfer conveyor upon removal of an empty pallet at the unloading means whereby a loaded pallet is moved onto the unloading means.

References Cited in the file of this patent

UNITED STATES PATENTS

| | | |
|---|---|---|
| 1,556,438 | Hanson et al. | Oct. 6, 1925 |
| 1,933,554 | Holmes | Nov. 7, 1933 |
| 2,397,720 | Beane | Apr. 2, 1946 |
| 2,510,573 | Gray | June 6, 1950 |
| 2,613,798 | McPhee | Oct. 14, 1952 |
| 2,636,625 | Pries | Apr. 28, 1953 |
| 2,700,449 | Gleason | Jan. 25, 1955 |
| 2,704,592 | Hoppe | Mar. 22, 1955 |
| 2,707,571 | Smith | May 3, 1955 |
| 2,869,737 | Thomas | Jan. 20, 1959 |